United States Patent [19]

Denber

[11] Patent Number: 5,214,470
[45] Date of Patent: May 25, 1993

[54] METHOD AND APPARATUS FOR COMPENSATING FOR DIRT OR ETCHED AREAS ON A DOCUMENT PLATEN

[75] Inventor: Michel J. Denber, Rochester, N.Y.

[73] Assignee: Xerox Corporation, Stamford, Conn.

[21] Appl. No.: 865,528

[22] Filed: Apr. 9, 1992

[51] Int. Cl.$^5$ .................... G03G 21/00; G03B 27/62
[52] U.S. Cl. ........................................ 355/75; 355/77; 355/230; 358/474; 382/54
[58] Field of Search .................... 355/75, 77, 208, 230; 358/474; 382/54

[56] References Cited

U.S. PATENT DOCUMENTS

| | | | |
|---|---|---|---|
| 4,215,930 | 8/1980 | Miyakawa et al. | 355/208 |
| 4,335,173 | 6/1982 | Caraballo | 428/65 |
| 4,646,355 | 2/1987 | Petrick et al. | 382/54 |
| 4,698,843 | 10/1987 | Burt et al. | 382/54 |
| 4,747,156 | 5/1988 | Wahl | 382/54 |
| 4,769,849 | 9/1988 | Alsing | 382/9 |
| 4,970,606 | 11/1990 | Shima | 358/474 |
| 5,029,226 | 7/1991 | Klein et al. | 382/50 |

FOREIGN PATENT DOCUMENTS 60-28644  2/1985  Japan .
61-198960 9/1986  Japan .
1-144773  6/1989  Japan .

*Primary Examiner*—Fred L. Braun

[57] ABSTRACT

A method and apparatus are provided for detecting the presence of dirt or abrasions or etched areas on a document platen and for preventing these defects from being reproduced as unwanted spots on output copies. The platen is first scanned without a document placed thereon and an electronic image is generated and stored which contains information on the location of a dirt spot or inherent defects such as etched marks. Upon the initiation of a scanning mode with a document placed on the platen, the scanned electronic document image is subjected to a logical XOR process to correlate the previously stored spot location with the same location on the document image which is generated and stored. Once the spot location is determined, the spot is erased. A further logical step is used to determine whether the spot lies wholly or partially within any informational areas of the document image. To the extent there is such an overlap, the spot is restored to black in the overlapping areas.

7 Claims, 4 Drawing Sheets

METHOD AND APPARATUS FOR COMPENSATING FOR DIRT OR ETCHED AREAS ON A DOCUMENT PLATEN

BACKGROUND OF THE INVENTION

The present invention relates to an electrophotographic copying machine and, more particularly, to a recognition and discrimination system for identifying spots or etched areas on a document platen and for preventing the reproduction of the spot or etched areas during a document copying operation.

Digital scanning techniques are well known in the art wherein documents are placed on a document glass platen and scanned by a CCD array to capture an electronic image of the document. The output of the array, representing the scanned document, can be digitized and used, for example, to drive a Raster Output Scanner at a local or remote location.

A problem in prior art machines is that any defects which exist in or on the document platen are perceived as "information" by the scanning device and incorporated when scanning a document. For example, dirt specks or portions of the platen which have become degraded (etched) by, for example, operation of a document handling feed roll system, are reproduced as black spots or marks on output copies made of documents scanned on the platen.

It is an object of the present invention to identify dirt or etch marks on a platen so as to prevent a reproduction of these marks on output copies. This object is achieved by first scanning a platen without a document thereon and storing the representative digital image in a controller memory. This reference image provides information on the presence and location of marks of dirt or etched areas on the platen and is available for performing certain logic operations with subsequent stored images made of documents which are placed on the platen. Once the mark location is determined on the stored image which represents the document that has been scanned, the spot is erased by changing pixel status from black to white. A second logical process is implemented to determine whether the spot is wholly or partially within any informational areas of the document, in which case, some or all of the spot that has been erased is restored. More particularly, the present invention relates to a method of compensating for dirt or etched areas in a document platen comprising the steps of:

scanning the platen in the absence of a document, the platen having at least one dirt or etched area on the surface thereof, generating digital output signals representative of said scanned platen, processing said digital output signals to create a platen bit map image of black and white pixels of said scanned platen image, said black pixels representing the dirt or etch area, scanning the platen in the presence of a document having information content thereon, generating digital output signals representative of said scanned document, processing said document output signals to create a document bit map image of black and white pixels, the black pixels representing information content and the dirt or etch area, determining the location of the dirt or etch area within the document bit map image and changing the pixels representing the dirt or etch area to white, performing a spiral growth process function on that section of the bit map image which incorporates the recognized dirt or etch area to determine whether the area lies wholly or partly within an information content area of the document image, and restoring the pixels from white to black values when the entire area or portion of the area is determined to lie within an information content area of the document.

DESCRIPTION OF THE DRAWINGS

Referring to FIG. 1, there is shown a scanning system 8 which incrementally scan-illuminates a document 10 placed on the surface of platen 12. The document is placed face down and it extends into the plane of the page. It is assumed that the platen has a dirt mark 13 (FIG. 3) which lies within the document area to be scanned The document is scanned from left to right by illuminating lamp assembly 14 and full rate mirror 16. Assembly 14 and mirror 16 are mounted on a scan carriage (not shown) adapted to travel along a path parallel to and beneath the platen. Assembly 14 illuminates an incremental line portions of document 10. The reflected image is reflected by scan mirror 16 to corner mirror assembly 18, which is adapted to move at one half the rate of mirror 16. The document image is projected along the optical path through reduction lens 20 onto a solid state photosensor array 22. Array 22, in a preferred embodiment, comprises a 1024 element CCD array of sufficient width to sense the entire image projected through lens 20. Each photosensor generates an electrical video image signal corresponding to a detected portion of the original document. The photosensors are sampled successively as each line in the document is scanned to provide a stream of image signals or pixels for each scanned line. The output of array 22 is, thus, a stream of image signals, or pixels which pass to an image processor 23, a subassembly of central processing unit (CPU) 24, where the analog image signals are thresholded and converted to a binary digital signal representing either a black or white area of the scanned document. Thus, a digital image, in the form of a serial matrix or bit map representing the entire document, is stored in memory. In a preferred embodiment, CPU 24 is a microprocessor made by Intel Corporation under the Model 8086, modified according to the principles of the present invention. CPU 24 also controls the scanning operation and other functions to be discussed later. Continuing with the description, image processor 23 contains logic circuitry which recognized the presence of spot 13 on the platen (by identifying the position of a bit map which represents the spot) and performs the steps to erase the dirt spot image either wholly or in part, from the stored image of the document. The spot is recognized and erased by implementing a series of processing steps shown in the flow diagram of FIG. 2. Referring to FIGS. 2 and 3, the platen 12, before the document is placed thereon, is scanned (block 30) under control of CPU 24. The reference image is projected onto array 22 and the bit map image is created and stored in a memory buffer in the image processor (block 32). The reference image 28 corresponding to that shown in FIG. 3 captures the dirt spot 13 at the location shown. Reference image 28 remains stored in memory in bit map form, as long as the spot removal process is in use.

When a normal copy mode is initiated, a document 10 is placed on platen 12 either manually or by a document handler (not shown). A normal scan cycle is initiated (block 34) and a document image is generated at array 22 and sent to the image processor where a logical XOR (exclusive-or) operation is performed between the bit map stored image 28 and the document image (block 38). This operation has the effect of erasing spot 13 from the document image; e.g. all pixels in image 28 which are identified as being within the spot are changed from black to white pixels. FIG. 4A shows a second document "image" 28A before processing, with dirt spot 13 appearing outside of the information content contained in the document. FIG. 4B shows the schematic representation of the logical XOR process location locating the spot 13 and erasing it to result in a corrected document image shown in FIG. 4C. This document image can then be sent to, for example, a ROS unit to print out an output copy which will not exhibit the black mark corresponding to the dirt mark.

The document imaging sequence shown in FIGS. 4A-4C is used as an example for a document which has the spot outside of the informational content area. However, two other situations may be present. The dirt spot, represented now by 13', may lie within a wholly black informational region 60 in image 28B (FIG. 5) or partially within a black informational region 62 in image 28C (FIG. 6). For the situation shown in FIG. 5, results erasing of spot 13 creates a hole in the information segment. Therefore, the entire spot must be restored (block 42, 44 in FIG. 2). For the situation shown in FIG. 6, the spot must be partially restored (blocks 46, 48, FIG. 2). Of course, if the spot is completely outside the informational area (FIG. 4A), no further operation is required and image 28A is stored with the spot erased (blocks 50, 52, FIG. 2). The exact interaction of spot to document information content is determined by implementing a spiral region growing process step. This process is generally described with reference to FIGS. 7 and 8. For each noise spot in the reference image, an arbitrary starting pixel is identified along the perimeter of the spot; e.g. "A" in FIG. 7. The color of this pixel's nearest neighbors B, C, D, outside the spot in the scanned document image are noted. If a majority of the neighbors are black pixels, then the perimeter pixel A is turned black. This process is repeated for every pixel, spiraling clockwise along the perimeter of the spot. Upon returning to starting pixel A, the first pixel proceeding towards the center of the spot is selected and the perimeter transversal process repeated. This pattern repeats until the center of the spot is reached and all pixels within the spot have been processed. The processing follows a spiral pattern from the outer edge of the spot into the center. If the spot lies entirely within a black region, this process fills it in completely (all white pixels change to black). If the spot overlaps a black region (FIG. 6) only the part lying in the black area is filled in. The spiral registration growth process is shown in detail in FIGS. 8a-8d. FIG. 8a shows the result of XOR'ing away the noise spot 13' overlapping the right hand edge of the black region 62 in FIG. 6. For this particular spot, three iterations around the circle are needed (FIGS. 8b-8d). Since the pixels along the right hand half of the circle all have white neighbors, they remain unchanged. The pixels on the left side are all adjacent to a black region, and are therefore changed from white to black.

As an alternative to the spiral region growth technique, an alternate process first locates a perimeter pixel with all white neighbors and steps around the perimeter until a pixel with a black neighbor is encountered. At this point, the direction of travel is reversed, returning back along the perimeter until a black pixel is encountered at the other end. A line is then drawn connecting the two identified black pixels and all pixels in the spot on the other side of the line are filled in. FIG. 9 illustrates an example of the filling-in order using this process. The chosen starting pixel is indicated in bold. The initial direction of travel is clockwise (pixels 1-5). Pixel 5 has a black neighbor, so the search shifts back to pixel 1 and continues in the other direction (pixels 6-8). Pixel 8 has a black neighbor, so a line is drawn from 8 to 5 and all pixels to the left are filled in.

As a still further alternative, a simple fill in process may be implemented when the average size of spot 13, or 13' is much smaller than the smallest pixel element. This is done by NOR'ing a copy of the reference image with the document image, one pixel in each direction, left, right, up, and down. This uses the adjacent black regions of the document image to fill in the edges of the spots in the reference image. The result is then OR'ed into the final image. This process can be accomplished very quickly using bitblt, although the results will not be as good in every case as with the spiraling process.

Figure 1:
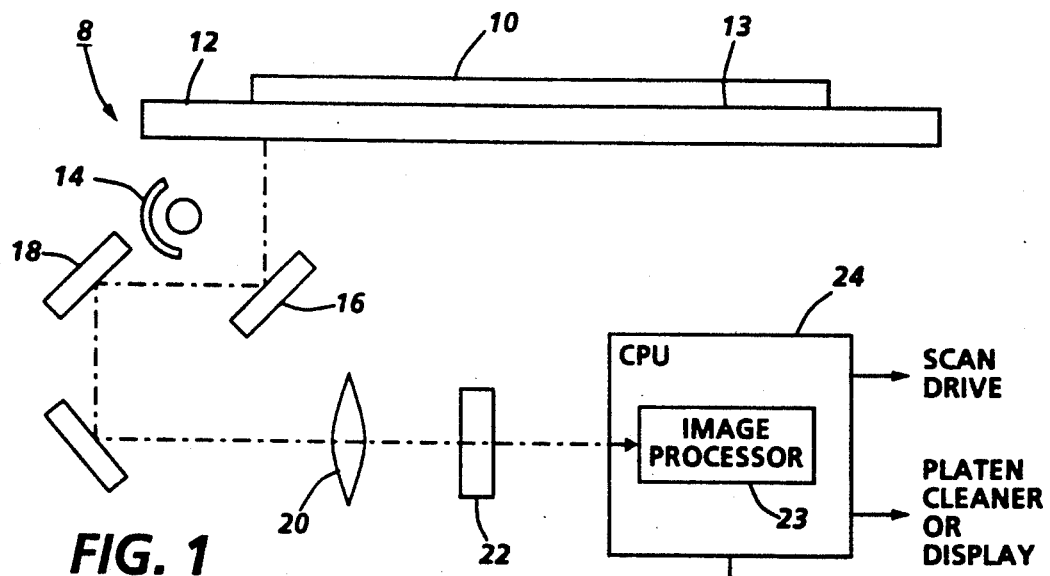
FIG. 1 is a schematic side view of an optical system which incorporates the spot recognition and removal circuitry of the present invention.
Figure 2:
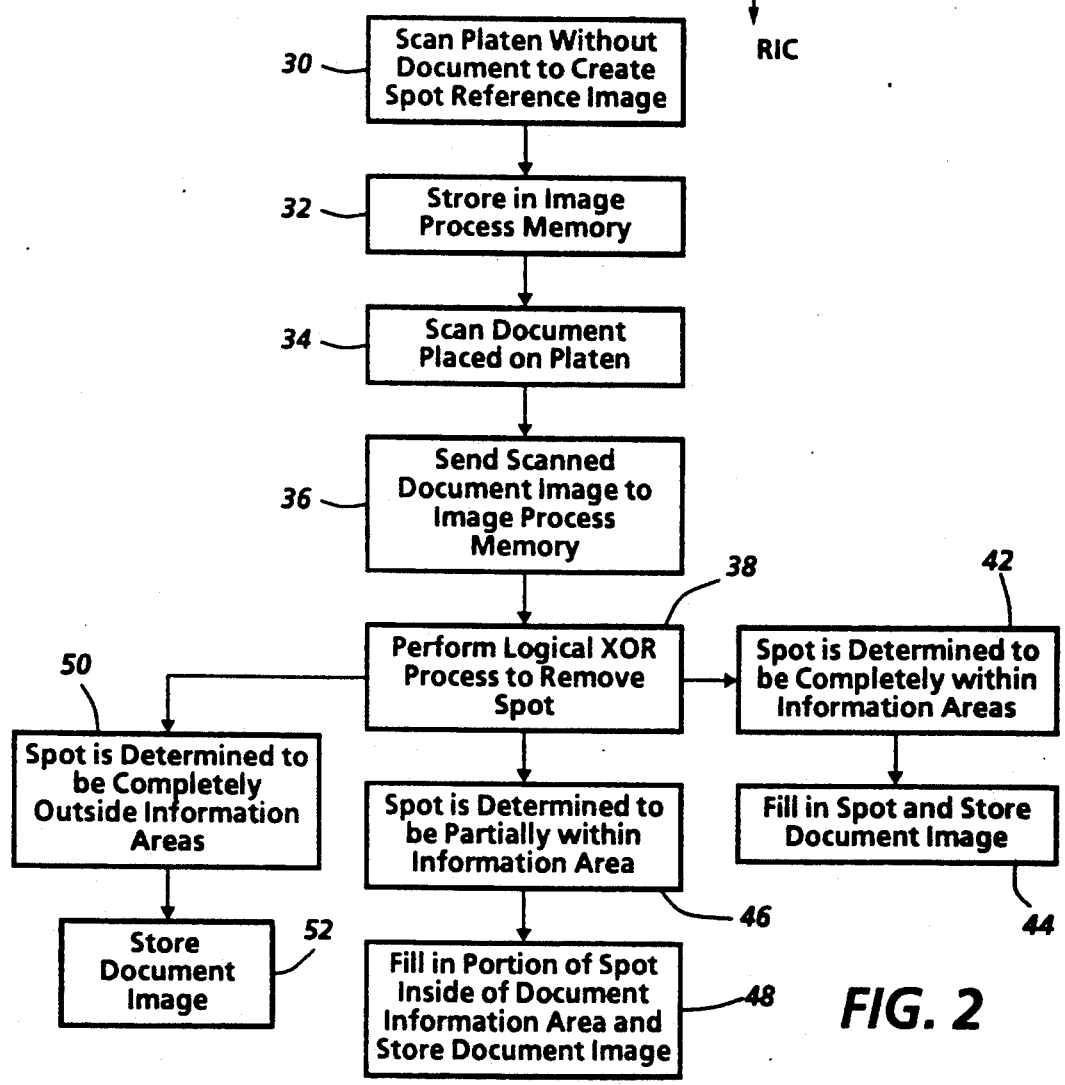
FIG. 2 is a flow diagram of the spot removal image processing.
Figure 3:
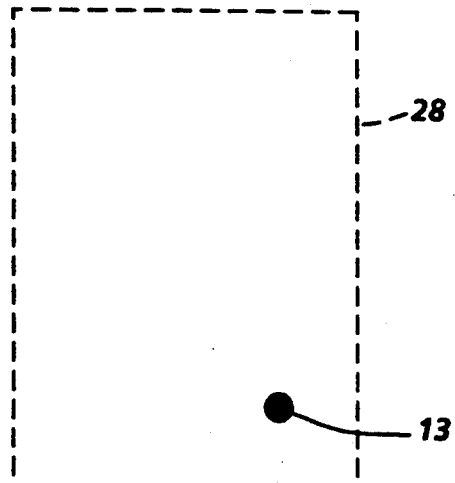
FIG. 3 is a reference image of the platen scan without a document to illustrate the scanning and storage of a dirt spot.
Figure 4A:
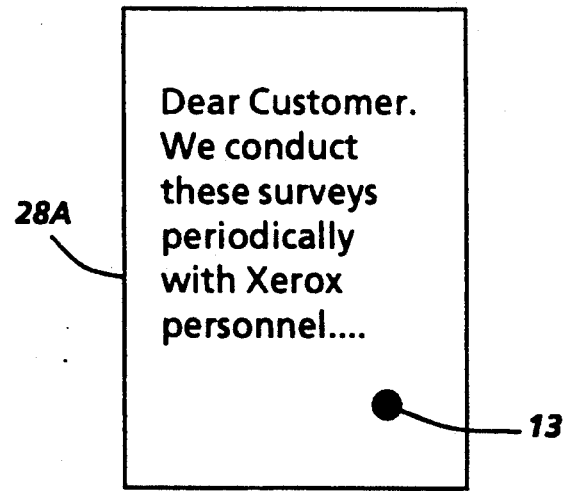
FIGS. 4A, 4B, and 4C shows a reference image of a document and a dirt spot following scan.
Figure 4B:
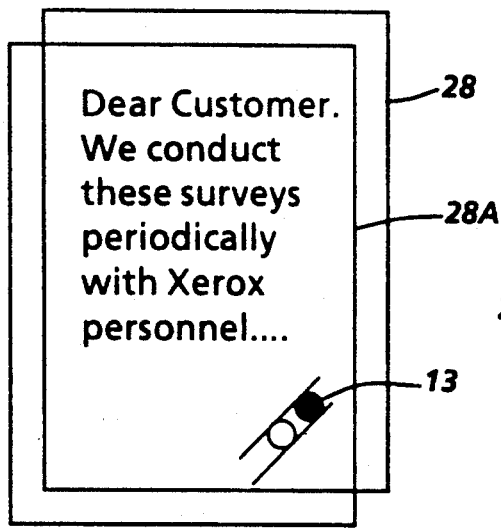
Figure 4C:
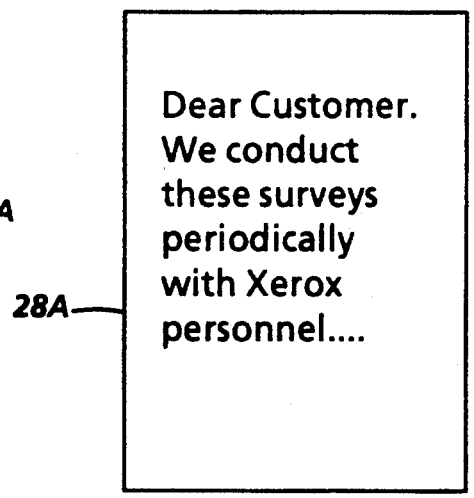
Figure 5:
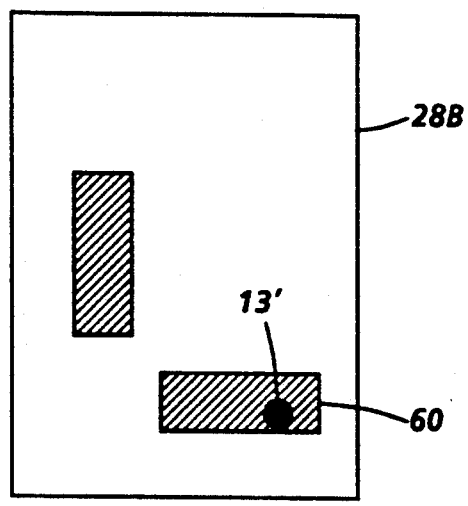
FIG. 5 shows a reference image with the spot lying within an information area of the document being scanned.
Figure 6:
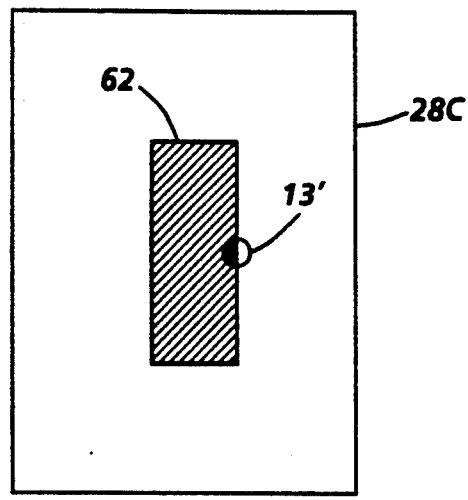
FIG. 6 shows a reference image wherein the spot lies partially within an information area of the document being scanned.
Figure 8A:
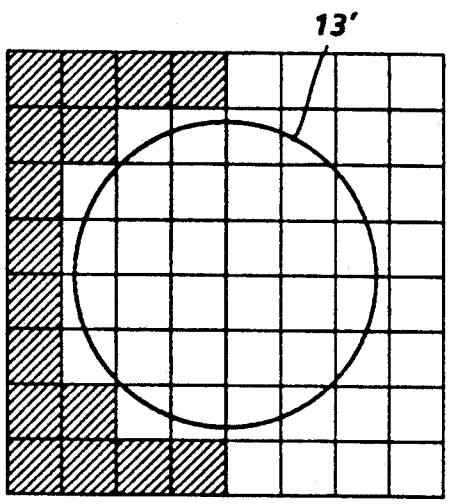
FIGS. 8A, 8B, 8C, and 8D shows a bit map representation sequence illustrating how a spot is partially restored.
Figure 8B:
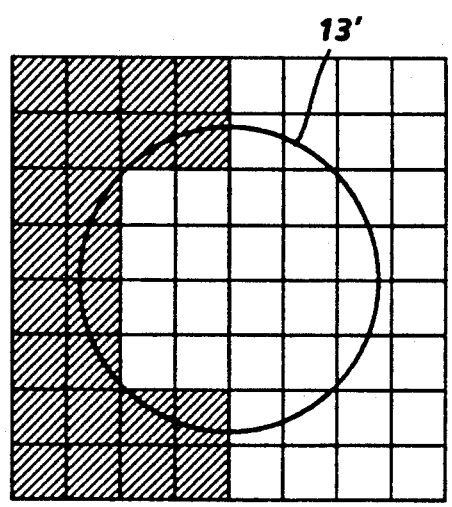
Figure 8C:
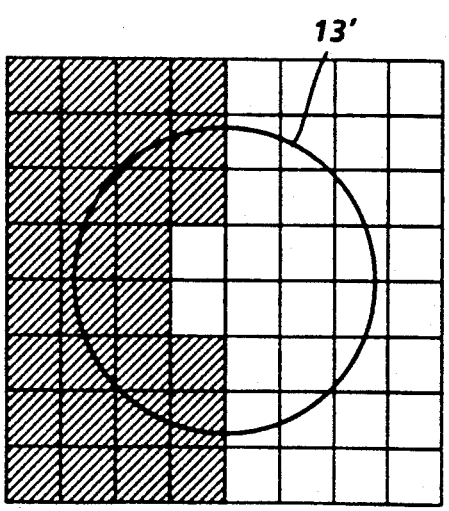
Figure 8D:
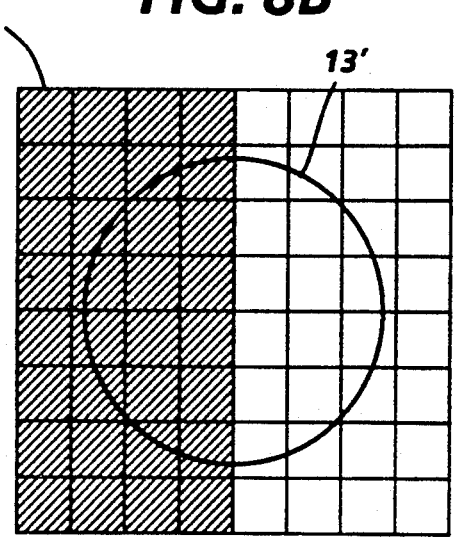
Figure 7:
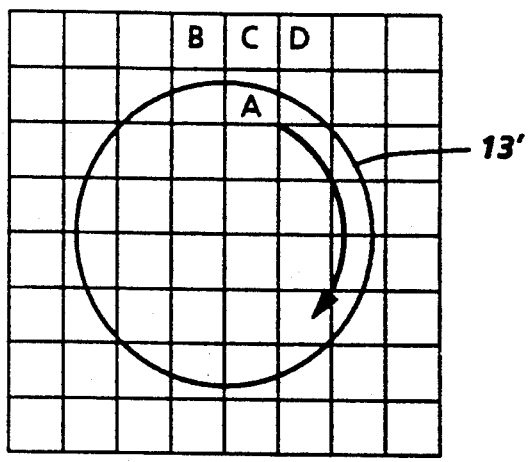
FIG. 7 shows a bit map representation of a portion of the reference image.
Figure 9:
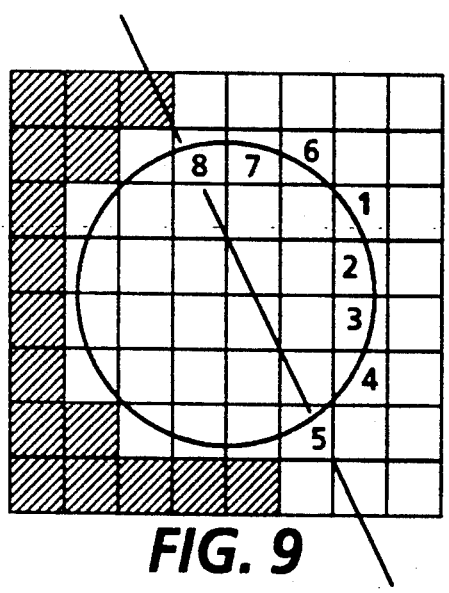
FIG. 9 is an alternate embodiment of the technique shown in FIG. 7.
Figure 10:
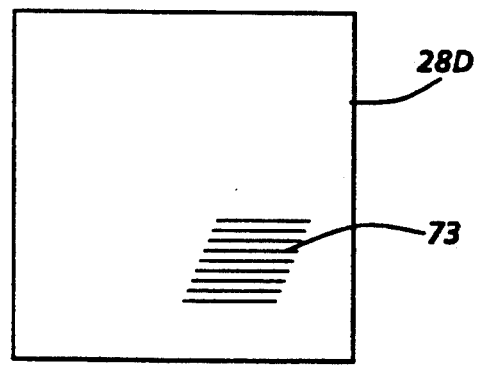
FIG. 10 is a reference image similar to FIG. 3, but showing a detected etch mark.

It is understood from the preceding, that spots 13, 13' were only representative of the type of defect which could be present on the platen. There could be multiple dirt spots located on other platen locations. Also, the defect could be in the form of an abraded portion (etch) on the platen creating etch marks 73 in the reference image 28D shown in FIG. 9. As a further feature of the present invention, the image processor 23 can be programmed to identify an etch mark by looking for a characteristic "noise" pattern. Once such an identification is made, a signal can be sent to a remote RIC system (FIG. 1) providing to a tech rep advanced warning of the need for platen replacement. Also, as shown in FIG. 1, additional signals can be generated upon identifying dirt spots to, for example, activate an automated platen glass cleaner or to activate a display to alert an operator to clean a platen.

While the invention has been described with reference to the structures disclosed, it is not confined to the details set forth, but is intended to cover such modifications or changes as they come within the scope of the following claims.

What is claimed is:

1. A method of compensating for dirt or etched areas in a document platen comprising the steps of:

scanning the platen in the absence of a document, the platen having at least one dirt or etched area on the surface thereof, generating digital output signals representative of said scanned platen, processing said digital output signals to create a platen bit map image of black and white pixels of said scanned platen image, said black pixels representing the dirt or etch area, scanning the platen in the presence of a document having information content thereon, generating digital output signals representative of said scanned document, processing said digital output signals representative of said scanned document to create a document bit map image of black and white pixels, the black pixels representing information content and the dirt or etch area, determining the location of the dirt or etch area within the document bit map image and changing the pixels representing the dirt or etch area to white, performing a spiral growth process function on that section of the bit map image which incorporates the recognized dirt or etch area to determine whether the area lies wholly or partly within an information content area of the document image, and restoring the pixels from white to black values when the entire area or portion of the area is determined to lie within an information content area of the document.

2. The method of claim 1 wherein said spiral growth process function is enabled by an inverted spot correction algorithm.

3. The method of claim 2 including the further step of generating a signal alerting an operator that the platen must be cleaned or replaced.

4. The method of claim 1 wherein said spiral growth process function is enabled by a modified filling algorithm.

5. The method of claim 1 wherein said step of determining the location of the dirt or etched area is enabled by performing a logic XOR computation between the platen bit map image and the document bit map image.

6. In an image reproduction machine, the combination of:

image data input means for scanning an original document on a document platen and for generating output digital signals corresponding to black and white areas of said document and said platen, black areas on said platen corresponding to dirt or abraded areas, and processing means for digitizing said output signals and storing images of said document and said platen as a bitmap representations, said processing means adapted to recognize black areas of the bitmap representation which are attributable to dirt or abraded areas on the platen, rather than document information areas and to determine whether the black areas lie wholly or partly within an information content area of the document image.

7. The reproduction machine of claim 6 wherein said processing means is further adapted to restore said black areas when said black areas are identified as lying partially or wholly within information content areas of the document.

* * * * *